(12) United States Patent
Pan

(10) Patent No.: US 10,468,070 B2
(45) Date of Patent: Nov. 5, 2019

(54) HARD DISK DRIVE BRACKET

(71) Applicants: INVENTEC (PUDONG) TECHNOLOGY CORPORATION, Shanghai (CN); INVENTEC CORPORATION, Taipei (TW)

(72) Inventor: Tao Pan, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/780,205

(22) PCT Filed: Mar. 2, 2016

(86) PCT No.: PCT/CN2016/075324
§ 371 (c)(1),
(2) Date: May 30, 2018

(87) PCT Pub. No.: WO2017/092185
PCT Pub. Date: Jun. 8, 2017

(65) Prior Publication Data
US 2018/0358054 A1    Dec. 13, 2018

(30) Foreign Application Priority Data
Nov. 30, 2015    (CN) .......................... 2015 1 0859389

(51) Int. Cl.
*G11B 33/12*    (2006.01)
*G06F 1/18*    (2006.01)
*F16B 2/22*    (2006.01)

(52) U.S. Cl.
CPC .............. *G11B 33/124* (2013.01); *F16B 2/22* (2013.01); *G06F 1/18* (2013.01); *G06F 1/187* (2013.01); *G11B 33/127* (2013.01); *G11B 33/128* (2013.01)

(58) Field of Classification Search
CPC ... G11B 33/124; G11B 33/123; G11B 33/125; G11B 33/127; G11B 33/128; F16B 2/22; G06F 1/18; G06F 1/187
(Continued)

(56) References Cited

U.S. PATENT DOCUMENTS 6,771,496 B1    8/2004    Wu
8,203,835 B2    6/2012    Yeh et al.
(Continued)

FOREIGN PATENT DOCUMENTS

CN    1289954 A    4/2001
CN    101122810 A    2/2008
(Continued)

*Primary Examiner* — Nkeisha Smith
(74) *Attorney, Agent, or Firm* — Maschoff Brennan

(57) ABSTRACT

A hard disk drive bracket is configured to be fixed within a hard disk drive holder and includes a support portion, a tray and an elastic piece. The tray is connected to a side of the support portion and has a chassis and a sidewall protruding form a side of the chassis. The elastic piece is suspended above the tray and has a first end fixed to the support portion and a second end forming a hook. The elastic piece and the tray form a holding space therebetween for holding a hard disk drive. When the hard disk drive is inserted into the chassis along a bending direction of the second end of the elastic piece, the second end lifts to hold the hard disk drive between the chassis and the elastic piece. The sidewall fixes the hard disk drive on the chassis with the cooperation of the elastic piece.

11 Claims, 1 Drawing Sheet

(58) Field of Classification Search
USPC .................................. 248/316.7, 27.1, 27.8
See application file for complete search history.

(56) References Cited

U.S. PATENT DOCUMENTS

| | | | | |
|---|---|---|---|---|
| 9,240,219 | B2* | 1/2016 | Zhong | G11B 33/08 |
| 9,412,418 | B2* | 8/2016 | Hu | G06F 1/18 |
| 9,454,140 | B2* | 9/2016 | Godau | H01R 9/2458 |
| 9,911,464 | B2* | 3/2018 | Jau | G06F 1/187 |
| 2016/0150878 | A1* | 6/2016 | Clark | B65G 1/02 |
| | | | | 211/184 |
| 2019/0053395 | A1* | 2/2019 | Kettern | H05K 7/1468 |

FOREIGN PATENT DOCUMENTS

| | | |
|---|---|---|
| CN | 201421574 Y | 3/2010 |
| CN | 201689373 U | 12/2010 |
| CN | 202600602 U | 12/2012 |
| CN | 204270217 U | 4/2015 |
| CN | 204695189 U | 10/2015 |
| TW | M458773 U | 8/2013 |
| TW | 201501621 A | 1/2015 |

\* cited by examiner

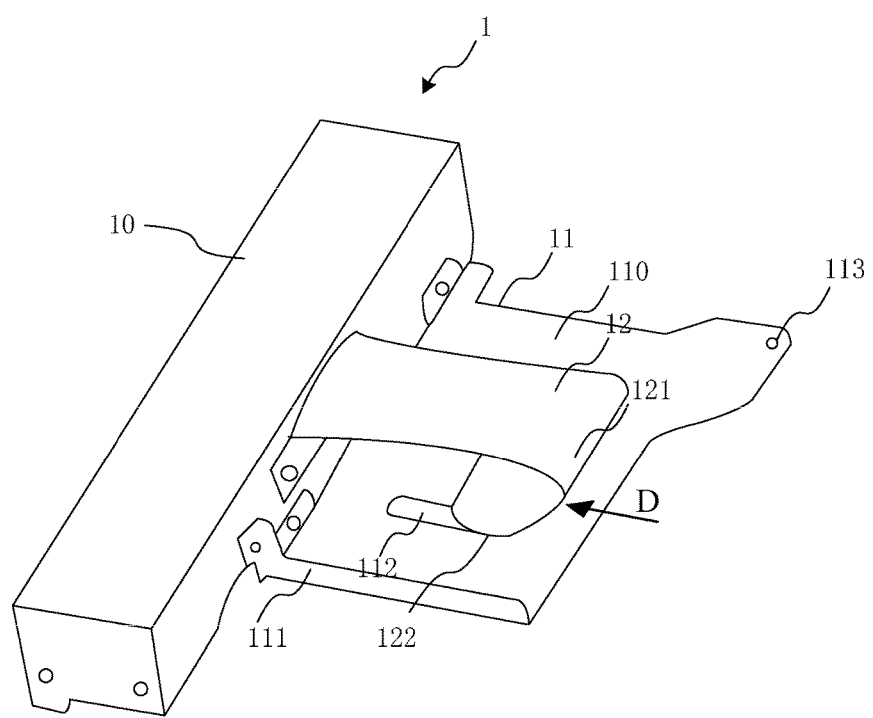

HARD DISK DRIVE BRACKET

TECHNICAL FIELD

The invention is related to data storage technology, more particularly to install device technology, and specifically is a hard disk drive bracket.

BACKGROUND

With the advancement of technology, the storage capacity of electronic devices is also getting larger and larger. In this way, users can store more data in the electronic devices. Taking a server as an example, the server can contain many hard disk drives, many storage devices and a casing. The hard disk drive may be installed into the storage device by a plurality of fixing members, and the storage device is then fixed in the case by a plurality of additional fixing frames. For example, the fixing members may be screws, users may use the screws to install the hard disk drives into the storage devices, and then the storage devices are fixed to the case, the fixing members may also be hard disk drive brackets disposed on the storage devices, such that the hard disk drives can be installed on the storage devices via the hard disk drive brackets. In this way, a storage device equipped with a plurality of hard disk drives allows the users to store date and use the date in these hard disk drives. Furthermore, the users can also remove the brackets to detach the storage devices from the case and to separate the hard disk drives from the storage devices to replace the storage devices. However, after the fixing members are repeatedly detached and used, the fixing members become easy to loosen and are no longer to fix the hard disk drives in position.

SUMMARY

In view of the disadvantages of the prior art described above, the present invention provides a hard disk drive bracket, which is able to solve the problem that, in the prior art, the fixing member is easily loosened after the hard disk drive is repeatedly detached so that the hard disk drive cannot be firmly fixed in position.

For the above purpose and other related purposes, the present invention provides a hard disk drive bracket including a support portion, a tray and an elastic piece. The tray is connected to a side of the support portion and has a chassis and a sidewall protruding form a side of the chassis. The elastic piece, is suspended above the tray, the elastic piece has a first end fixed to the support portion and a second end in a form of a hook, the elastic piece and the tray form a holding space therebetween for holding a hard disk drive. When the hard disk drive is inserted into the chassis along a bending direction of the second end of the elastic piece, the second end of the elastic piece is elastically deformed and lifted so as to hold the hard disk drive between the chassis and the elastic piece. The sidewall restrains a side of the hard disk drive so as to fix the hard disk drive on the chassis with the cooperation of the elastic piece.

An auxiliary technical feature extended from the aforementioned technical features is: when the hard disk drive is not inserted into the chassis, a vertical distance between the second end of the elastic piece and the chassis is less than a thickness of the hard disk drive.

An auxiliary technical feature extended from the aforementioned technical features is: when the hard disk drive is inserted into the chassis, the second end of the elastic piece is elastically deformed and lifted from 5 mm to 11 mm. An auxiliary technical feature extended from the aforementioned technical features is: the chassis has a trench.

An auxiliary technical feature extended from the aforementioned technical features is: there is a protruding structure located at a corner of a side opposite to the side of the chassis in which the support portion is connected.

An auxiliary technical feature extended from the aforementioned technical features is: the second end of the elastic piece includes: a first bending part which is bent downward and toward the support portion; and a second bending part which makes an edge of the top of the second end bent upward.

An auxiliary technical feature extended from the aforementioned technical features is: the first bending part and the second bending part have round corners.

An auxiliary technical feature extended from the aforementioned technical features is: the tray is connected to the support portion via rivets; the first end of the elastic piece is connected to the support portion via rivets.

An auxiliary technical feature extended from the aforementioned technical features is: the support portion is in cuboid.

An auxiliary technical feature extended from the aforementioned technical features is: the hard disk drive bracket is configured to be fixed within a hard disk drive holder.

As discussed above, the first end of the elastic piece of the hard disk drive bracket of the is fixed, the second end is suspended and in a form of a hook, and the elastic piece and the tray form a holding space therebetween for holding a hard disk drive. When the hard disk drive is inserted into the chassis along a bending direction of the second end of the elastic piece, the second end of the elastic piece is elastically deformed and lifted so as to hold the hard disk drive between the chassis and the elastic piece. The hard disk drive bracket of the present invention does not deform even underwent repetitive fatigue test and detaching test, thus it is able to achieve the purpose that the hard disk drive is still firmly fixed in position after repetitive removals.

DESCRIPTION OF THE DRAWING

FIG. 1 is a schematic view of a hard disk drive bracket of the present invention.

SYMBOL DESCRIPTION 1 hard disk drive bracket
10 support portion
11 tray
110 chassis
111 sidewall
112 trench
113 protruding structure
12 elastic piece
121 first bending part
122 second bending part

DETAILED DESCRIPTIONS

The embodiments of the present invention are described below through specific examples. Those skilled in the art can easily understand other advantages and effects of the present invention from the contents disclosed in this specification. The present invention can also be implemented or applied through different specific implementation manners. The details of this specification may also be based on different perspectives and applications, and various modifications or changes may be made without departing from the spirit of the present invention.

It should be noted that the structures, proportions, sizes, and the like shown in the drawing of the present specification are only for cooperating with the contents disclosed in the specification for the understanding and reading of those skilled in the art, and are not intended to limit the implementation of the present invention. The limited conditions are therefore not technically significant. Any modification of the structure, change of the proportional relationship, or adjustment of the size should not affect the effect of the present invention and the purpose it can achieve. The technical content disclosed can be covered within the scope of the present invention. At the same time, terms such as "up", "down", "left", "right", "middle" and "one" cited in the present specification are also for ease of description only and not for limiting the present invention. The relative changes or adjustments of the relationship, and the content of the substantive invention, are also deemed to be the areas in which the invention can be implemented.

The purpose of this embodiment is to provide a hard disk drive bracket, which is able to solve the problem that, in the prior art, the fixing member is easily loosened after the hard disk drive is repeatedly detached so that the hard disk drive cannot be firmly fixed in position. The following describes a hard disk of this embodiment. The principle and implementation of the disk drive bracket enable those skilled in the art to understand the hard disk drive bracket of this embodiment without requiring creative labor.

Please refer to FIG. 1, FIG. 1 is a schematic view of a hard disk drive bracket of the present invention. As shown in the FIGURE, this embodiment provides a hard disk drive bracket 1, and the hard disk drive bracket 1 includes a support portion 10, a tray 11 and an elastic piece 12.

The hard disk drive bracket 1 may be fixed within a hard disk drive holder. The support portion 10 is configured to support and fix the tray 11 and the elastic piece 12. The support portion 10 at least has a fix surface for the tray 11 and the elastic piece 12 to be fixed thereon. The shape of the support portion 10 may match the structure of the hard disk drive holder in which the hard disk drive bracket 1 is fixed. Specifically, the support portion 10 is in cuboid.

The tray 11 is connected to a side of the support portion 10, the tray 11 has a chassis 110 and a sidewall 111 protruding form a side of the chassis 110. The tray 11 is connected to the support portion 10 via rivets. Specifically, the chassis 110 has a trench 112.

The trench 112 is configured to be connected to fasteners on the hard disk drive holder, such that the hard disk drive bracket 1 can be fixed on the hard disk drive holder. The size of the trench 112 and the location of the trench 112 on the chassis 110 may be adjusted according to the requirement of the fasteners on the hard disk drive holder.

In addition, in this embodiment, there is a protruding structure 113 located at a corner of a side opposite to the side of the chassis 110 in which the support portion 10 is connected, and there is a screw on the protruding structure 113, such that the chassis 110 can be further fixed to the hard disk drive holder via the screw.

The elastic piece 12 is suspended above the tray 11, the elastic piece 12 has a first end fixed to the support portion 10 and a second end in a form of hook, and there is a holding space formed between the elastic piece 12 and the tray 11 for holding a hard disk drive. When the hard disk drive is not yet inserted into the chassis 110, a vertical distance between the second end of the elastic piece 12 and the chassis 110 is less than a thickness of the hard disk drive. Specifically, the first end of the elastic piece 12 is connected to the support portion 10 via rivets, the second end of the elastic piece 12 includes: a first bending part 121 which is bent downward and toward the support portion 10 and a second bending part 122 which makes an edge of the top of the second end bent upward, and the first bending part 121 and the second bending part 122 have round corners.

When a hard disk drive is inserted into the chassis 110 along a bending direction D of the second end of the elastic piece 12, the second end of the elastic piece 12 is elastically deformed and lifted so as to hold the hard disk drive between the chassis 110 and the elastic piece 12, wherein the sidewall 111 of the tray 11 restrains a side of the hard disk drive so as to fix the hard disk drive on the chassis 110 with the cooperation of the elastic piece 12.

Specifically, in this embodiment, when the hard disk drive is inserted into the chassis 110, the second end of the elastic piece 12 is elastically deformed and lifted from 5 mm to 11 mm.

In this embodiment, the maximum that the elastic piece 12 can be lifted is 11 mm. The thickest hard disk drive is 9 mm, thus, according to a simulation experiment, when a 9 mm hard disk drive is inserted into the chassis 110, the elastic piece 12 can be lifted 9.3 mm. The hard disk drive can load 31 newtons (N) which is greatly larger than predetermined load value of 15 N, the thickest hard disk drive is 9 mm, thus even the thickest hard disk drive is still able to be placed into the hard disk drive bracket 1.

In this embodiment, according to a result of stress testing, the minimum holding stress of the elastic piece 12 to the hard disk drive is 7N, which ensures that the hard disk drive does not fall off from the hard disk drive bracket 1 when the hard disk drive is inserted into the hard disk drive bracket 1.

According to the discussions above, the first end of the elastic piece of the hard disk drive bracket of the present invention is fixed in position, the second end is suspended and is in a form of hook, and the elastic piece and the tray form a holding space therebetween for holding a hard disk drive; when the hard disk drive is inserted into the chassis along a bending direction of the second end of the elastic piece, the second end of the elastic piece is elastically deformed and lifted so as to hold the hard disk drive between the chassis and the elastic piece. The hard disk drive bracket of the present invention does not deform even underwent repetitive fatigue test and detaching test, thus it is able to achieve the purpose that the hard disk drive is still firmly fixed in position after repetitive removals. Therefore, the present invention effectively overcomes various shortcomings in the prior art and has a high degree of industrial utility value.

It will be apparent to those skilled in the art that various modifications and variations can be made to the present invention. It is intended that the specification and examples be considered as exemplary embodiments only, with a scope of the invention being indicated by the following claims and their equivalents.

The invention claimed is:

1. A hard disk drive bracket, comprising:
   a support portion;
   a tray, connected to a side of the support portion and having a chassis and a sidewall protruding form a side of the chassis; and
   an elastic piece, suspended above the tray, the elastic piece having a first end fixed to the support portion and a second end in a form of a hook, the elastic piece and the tray forming a holding space therebetween for holding a hard disk drive, wherein the second end of the elastic piece comprises a first bending part and a second bending part, the first bending part is bent downward and toward the support portion, and the second bending part which makes an edge of a top of the second end bent upward;

wherein, when the hard disk drive is inserted into the chassis along a bending direction of the second end of the elastic piece:

the second end of the elastic piece is elastically deformed and lifted so as to hold the hard disk drive between the chassis and the elastic piece; and the sidewall restrains a side of the hard disk drive so as to fix the hard disk drive on the chassis with the cooperation of the elastic piece.

2. The hard disk drive bracket according to claim 1, wherein when the hard disk drive is not inserted into the chassis, a vertical distance between the second end of the elastic piece and the chassis is less than a thickness of the hard disk drive.

3. The hard disk drive bracket according to claim 2, wherein when the hard disk drive is inserted into the chassis, the second end of the elastic piece is elastically deformed and lifted from 5 mm to 11 mm.

4. The hard disk drive bracket according to claim 1, wherein the chassis has a trench.

5. The hard disk drive bracket according to claim 4, wherein there is a protruding structure located at a corner of a side opposite to a side of the chassis in which the support portion is connected.

6. The hard disk drive bracket according to claim 1, wherein the first bending part and the second bending part have round corners.

7. The hard disk drive bracket according to claim 1, wherein the tray is connected to the support portion via rivets; and the first end of the elastic piece is connected to the support portion via rivets.

8. The hard disk drive bracket according to claim 1, wherein the support portion is in cuboid.

9. The hard disk drive bracket according to claim 1, wherein the hard disk drive bracket is configured to be fixed within a hard disk drive holder.

10. The hard disk drive bracket according to claim 1, wherein when the hard disk drive is inserted into the chassis, the second end of the elastic piece is elastically deformed and lifted from 5 mm to 11 mm.

11. The hard disk drive bracket according to claim 1, wherein there is a protruding structure located at a corner of a side opposite to a side of the chassis in which the support portion is connected.

* * * * *